US005349696A

United States Patent [19]

Matai

[11] Patent Number: 5,349,696

[45] Date of Patent: Sep. 20, 1994

[54] DATA DISPLAY RADIO PAGER WITH AUTOMATIC MESSAGE PROTECTION

[75] Inventor: Masahiro Matai, Tokyo, Japan

[73] Assignee: NEC Corporation, Japan

[21] Appl. No.: 800,987

[22] Filed: Dec. 2, 1991

[30] Foreign Application Priority Data

Nov. 30, 1990 [JP] Japan .................................. 2-336536

[51] Int. Cl.5 ........................... H04B 7/00; G08B 5/22

[52] U.S. Cl. ...................................... 455/70; 455/38.4; 340/825.44

[58] Field of Search .................... 455/38.1, 38.4, 185.1, 455/186.1, 70, 68, 186.2, 88, 226.4, 154.1, 158.2, 158.5; 340/825.44, 311.1

[56] References Cited

U.S. PATENT DOCUMENTS

| | | | |
|---|---|---|---|
| 4,477,808 | 10/1984 | Ichikawa | 455/38.4 |
| 4,768,031 | 8/1988 | Mori et al. | 455/343 |
| 4,959,644 | 9/1990 | Sato | 340/825.44 |

FOREIGN PATENT DOCUMENTS

| | | | |
|---|---|---|---|
| 0198537 | 8/1991 | Japan | 455/38.4 |
| 9102434 | 2/1991 | World Int. Prop. O. | 340/825.44 |

*Primary Examiner*—Reinhard J. Eisenzopf
*Assistant Examiner*—Nguyen Vo
*Attorney, Agent, or Firm*—Ostrolenk, Faber, Gerb & Soffen

[57] ABSTRACT

A data display pager capable of automatically protecting a particular message over a limited period of time. The receiver stores a message signal in a message signal storage area included in a controller thereof. When the pager detects protection information made up of a protection time signal indicative of a protection period and a set of particular marks, it protects the message signal over the protection time. The message signal is protected in either of two modes which are discriminated from each other on the basis of the number of or type of marks. During the protection time, the stored message is displayed in a first mode wherein a message without the protection information appears or in a second mode wherein the entire message appears, depending on the above-mentioned protection mode. On the expiration of the protection time, the stored message signal has, in a first protection mode, the protection information thereof deleted or has, in a second protection mode, only the particular marks thereof deleted.

18 Claims, 4 Drawing Sheets

| No. Mi | | | | | | | | | | | ... | | |
|---|---|---|---|---|---|---|---|---|---|---|---|---|---|
| M01 | c | c | c | c | c | c | c | c | c | c | ... | c | c |
| M02 | * | a | a | * | c | c | c | c | c | c | ... | c | c |
| M03 | c | c | * | * | b | b | * | c | c | c | ... | c | c |
| ... | | | | | | | | | | | | | |
| M14 | c | c | c | c | c | c | c | c | c | c | ... | c | c |
| M15 | c | c | b | b | c | c | c | c | c | c | ... | c | c |
| M16 | * | a | a | * | c | c | c | c | c | c | ... | c | c |

FIG. 4

DATA DISPLAY RADIO PAGER WITH AUTOMATIC MESSAGE PROTECTION

BACKGROUND OF THE INVENTION

The present invention relates to a data display radio pager and, more particularly, to a data display radio pager capable of automatically protecting a particular message signal over a limited period of time.

DESCRIPTION OF THE BACKGROUND ART

In a radio paging system, a data display radio pager generally has a radio frequency (RF) section for receiving, through an antenna an RF signal which is produced by modulating a carrier by a digital paging signal including an address signal and a message signal. The RF section converts the RF signal to an intermediate frequency (IF) signal. A demodulator demodulates the IF signal to reproduce the above-mentioned address signal. A decoder decodes the paging signal to produce a call signal including an address signal and a message signal. A control means has a CPU (Central Processing Unit) as a major component thereof and controls the reception in response to the call signal. Specifically, the control means determines whether or not the address signal is coincident with an address assigned to the pager and stored in a ROM thereof. If the former is coincident with the latter, the control means reports to the user of the pager of the reception of a call by, for example, an alert tone from a loudspeaker or through vibration and/or by displaying a message on message display means.

If the received address signal is coincident with the stored address, the control means stores the message signal included in the call signal in a message signal storage area of a memory which is built in the pager and capable of storing a plurality of message signals. On the reception of the message signal or on the entry of a request, for example, through a switch operated by the user, messages corresponding to the message signals stored in the memory are sequentially displayed on the message display means. The pager further includes message signal protecting means for preventing a message signal more important than a later message signal from being pushed out of the message signal storage area and thereby deleted by a later or less important message signal, and message signal deleting means for deleting needless message signals in the storage area. It has been customary with this kind of pager to start each of the message display, message signal protection and message signal deletion in response to the operation of a particular switch by the user. In addition, the number of messages which can be protected have heretofore been limited.

Assume that the user of the above-described radio pager has forgotten to delete a message (message signal) which is now stale due to the lapse of time, e.g., a message relating to a past appointment. Then, such an unnecessary message signal would continuously occupy the message signal storage area and thereby reduce the area for other newer message signals, thus interfering with the efficient use of the message signal storage area.

Moreover, when the pager is put in the user's bag, for example, it is likely that the switch for protecting a message signal and/or the switch for deleting it is accidentally operated due to the movement of the pager in the bag. Then, a message signal will be protected or deleted against the user's intention.

As stated above, the protection and deletion of message signals in sole reliance on switches is not satisfactory from the point of view of efficient use of message signal storage area and reliable protection and deletion of message signals.

BRIEF SUMMARY OF THE INVENTION

Objects of the Invention

It is, therefore, a first object of the present invention to provide a data display radio pager which automatically protects and deletes designated ones of message signals.

It is a second object of the present invention to provide a data display radio pager which protects and deletes message signals with reliability.

It is a third object of the present invention to provide a data display radio pager which frees the user from troublesome operations involving protecting and deleting message signals.

It is a fourth object of the present invention to provide a data display radio pager which enhances the efficient storage of useful message signals in a message signal storage area thereof.

SUMMARY OF THE INVENTION

The data display radio pager of the present invention, like a conventional pager of the type described, has an RF section, a demodulator, a decoder, a ROM, alerting means, message display means, and control means including a message signal storage area capable of storing a plurality of message signals. The radio pager also has a display switch for displaying a message corresponding to a stored message signal on the message displaying means, a protect switch for preventing an important message from being forced out of the storage area and of being automatically deleted by a succeeding message signal, and a delete switch for deleting an unnecessary message area in the storage area.

The radio pager of the present invention is mainly characterized in that it provides the; function of automatically protecting and from among the stored message signals, a designated message signal. Specifically, the control means first detects protection information requesting the automatic protection of a stored message signal out of other message signals. The protection information consists of a protection time signal indicative of a particular period of time for which the storage message signal should be protected, and a set of particular marks occurring before and after the protection time signal. On detecting the particular mark, the control means starts on checking the time by time counting means and, by referencing the time being counted by the time counting means, thus protecting the stored message with the protection information over the above-mentioned protection time. As the protection time elapses, the control means automatically cancels the protection of the message signal. Before the protection time expires, the user of the pager may operate the display switch to see a message corresponding to the stored message signal on the message display means at any time. On the the protection time lapses, the stored message signal with the protection information is automatically converted to a message signal without protection.

Further, the control means determines which set of particular marks and displays the stored message signal is to find in a particular mode. Specifically, when the control means determines that the set of particular marks is of a first kind, it displays a message corresponding to the stored message signal from which the particular marks have been removed. When the set of particular marks is of a second kind, the control means displays a message corresponding to the entire stored message signal including the particular marks. On the cancellation of the protection, the control means converts the stored message signal, in response to detection of the first kind of particular marks, to a message signal from which the protection information has been removed. It converts the stored message signal to a message signal from which only the particular marks have been removed in response to the detection of the second kind of particular marks.

The two kinds of particular marks are implemented as different characters or as different numbers of the same characters.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 4 schematically shows message signals stored in a RAM included in a control section which forms part of the embodiment.

DETAILED DESCRIPTION OF THE PREFERRED EMBODIMENT

Figure 1:
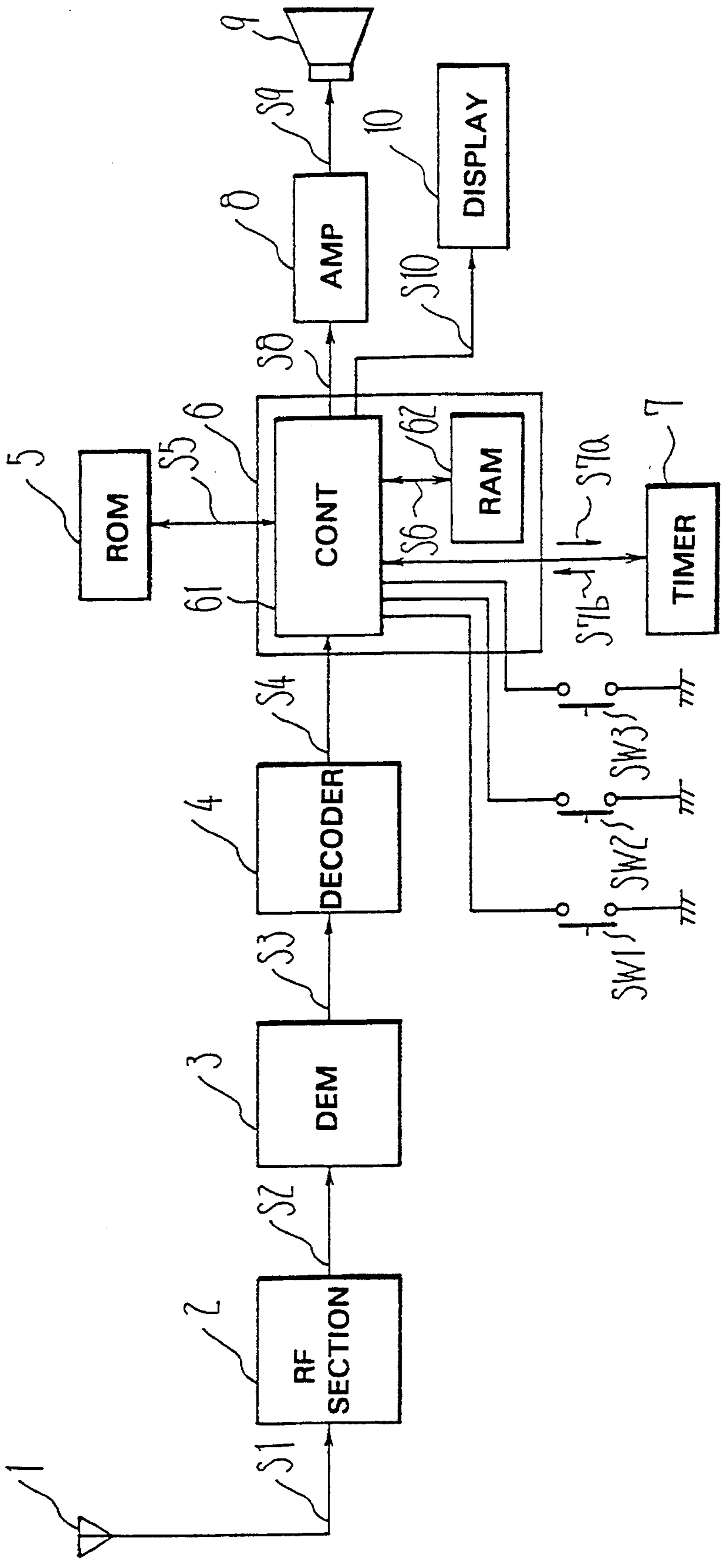
FIG. 1 is a block diagram schematically showing a data display radio pager embodying the present invention.

Referring to FIG. 1 the data display radio pager embodying the present invention includes an antenna 1. A radio frequency (RF) signal S1 generated with modulating a carrier by a paging signal which includes an address signal and a message signal is supplied to an RF section 2 via the antenna 1. The RF section 2 converts the RF signal S1 to an intermediate frequency (IF) signal S2. A demodulator 3 demodulates the IF signal S2 to produce the above-mentioned paging signal S3. A decoder 4 decodes the paging signal S3 to produce a call signals which includes the address signals and message signal. A control section 6 has a control circuit 61 as a major component thereof and controls the reception in response to the call signal. Specifically, the control circuit 61 determines whether or not the address signal matches an address assigned to and stored in the ROM (Read Only Memory) 5 of the pager and, if the answer is positive, generates a first tone signal S8. An amplifier 8 amplifies the first tone signal S8 to output a second tone signal S9. A loudspeaker 9 produces an alert tone in response to the second tone signal S8. While delivering the first tone signal S8, the control circuit 61 stores the message signal included in the paging signal S4 in a RAM (Random Access Memory) 62 which has a storage area capable of accommodating a plurality of message signals. The control circuit 61 feeds a display control signal S10 associated with the stored message signal to a display 10 with the result that a message corresponding to the signal S10 appears on the display 10. In this manner, the pager informs the person carrying it of the reception of a call by an alert tone and supplies the message on the display 10.

As the user of the pager presses a display switch SW1 at any desired time, the message signal stored in the RAM 62 appears on the display 10 (message displaying function). Such message signals stored in the RAM 62 one after another are sequentially forced out of the RAM 62 by message signals which are received afterwards. However, the user can protect important message signals by turning on a protect switch SW2 to thereby prevent them from being deleted (message signal protecting function). Further, the user can delete needless message signals by turning on a delete switch SW3 (message deleting function).

A timer 7 is connected to the control circuit 61 to count time, particularly the time that has elapsed after the reception of the message signal. The timer 7 is the major characteristic feature of the embodiment, i.e., it provides time information which is the basis of the automatic protection of message signals containing information to be protected and the cancellation of the automatic protection, as will be described later more specifically.

Figure 2:
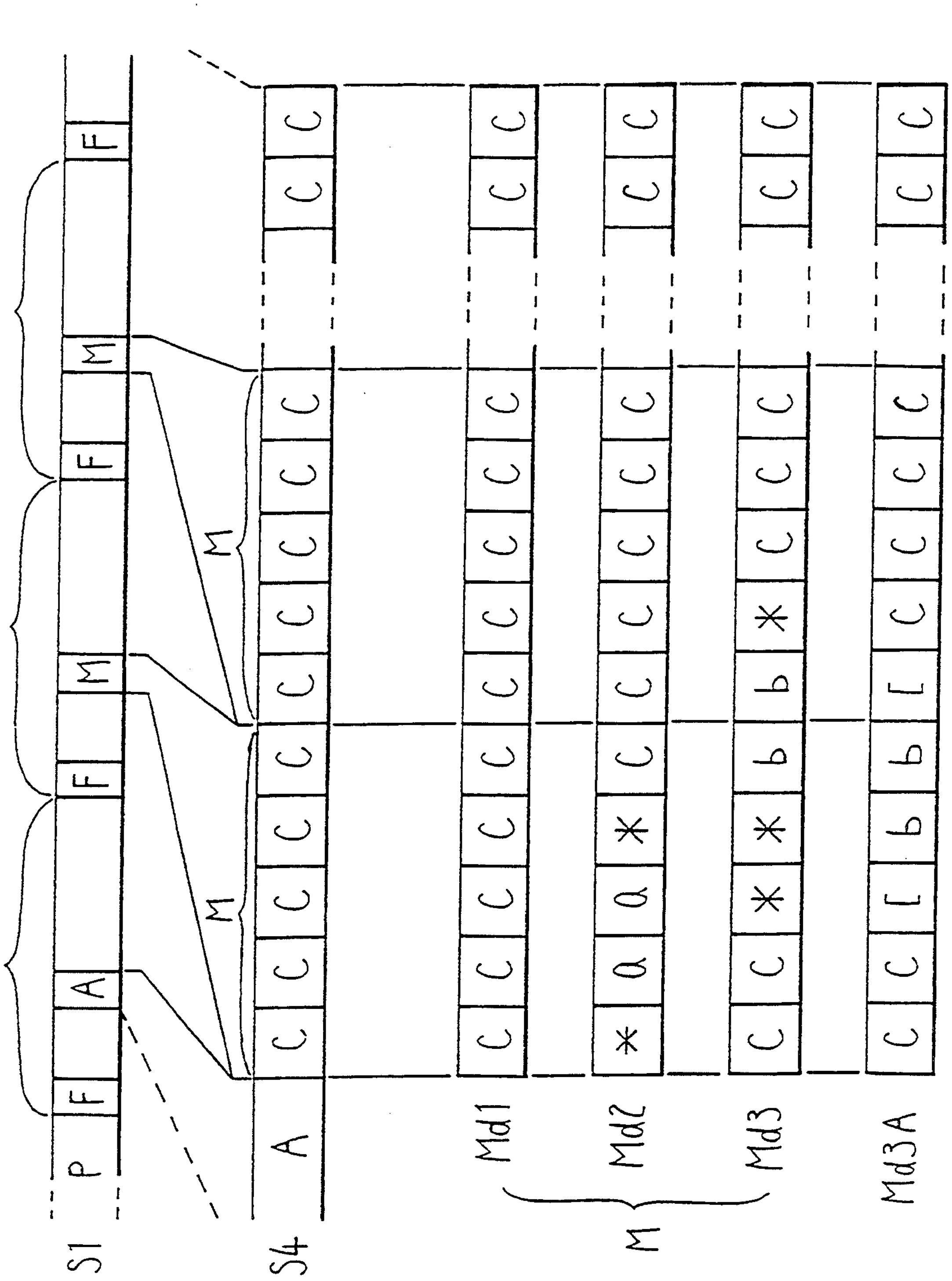
FIG. 2 shows a specific format of an RF signal received by the radio pager shown in FIG. 1 and specific formats of a call signal which is the output of a decoder included in the embodiment.

Referring also to FIG. 2, the RF signal 2 of the pager receives a digital paging signal (RF signal S1) of POCSAG (Post Office Standardization Advisory Group) format. The RF signal S1 has a preamble signal P and a plurality of batches following the preamble signal P. Each batch of the signal S1 is made up of one frame of frame synchronization signal F, and eight frames of address signal A or message signal M that follows the signal F. The RF section 2 and demodulator 3 receive, demodulate and decode the consecutive batches of the RF signal S1 in a single frame which is assigned to the pager, thereby producing a call signal S4 made up of an address signal A and a message signal M. The message signal M of each batch is constituted by five characters C (alphabets, numerals, and marks).

The message signal M constituted by the characters C may have three different kinds of signal formats, as follows. A message signal Md1 having a first format does not include a particular mark "*". When such a message signal Md1 is received, the control circuit 61 does not automatically protect the message Md1. A message signal Md2 having a second format contains protection information, i.e., a protection time signal as indicative of a time for which the signal Md2 should be protected and a particular mark "*" (protection indication signal) which occurs once before and once after the signal aa to show that the signal Md2 is a message signal M to be protected. Further, a message signal Md3 having a third format contains protection information, i.e., a protection time signal bb and a particular mark "*" occurring twice before and once after the signal bb.

If desired, the message signal Md3 having the third format may be replaced with a message signal Md3A, as also shown in FIG. 2. The message signal Md3A has a protection indication signal in the form of the mark "[" in place of the mark "*". The mark "[" occurs once before and once after the protection time signal bb. The aforementioned marks, e.g., the "x" or the "[", could be instead particular numerals.

Figure 3:
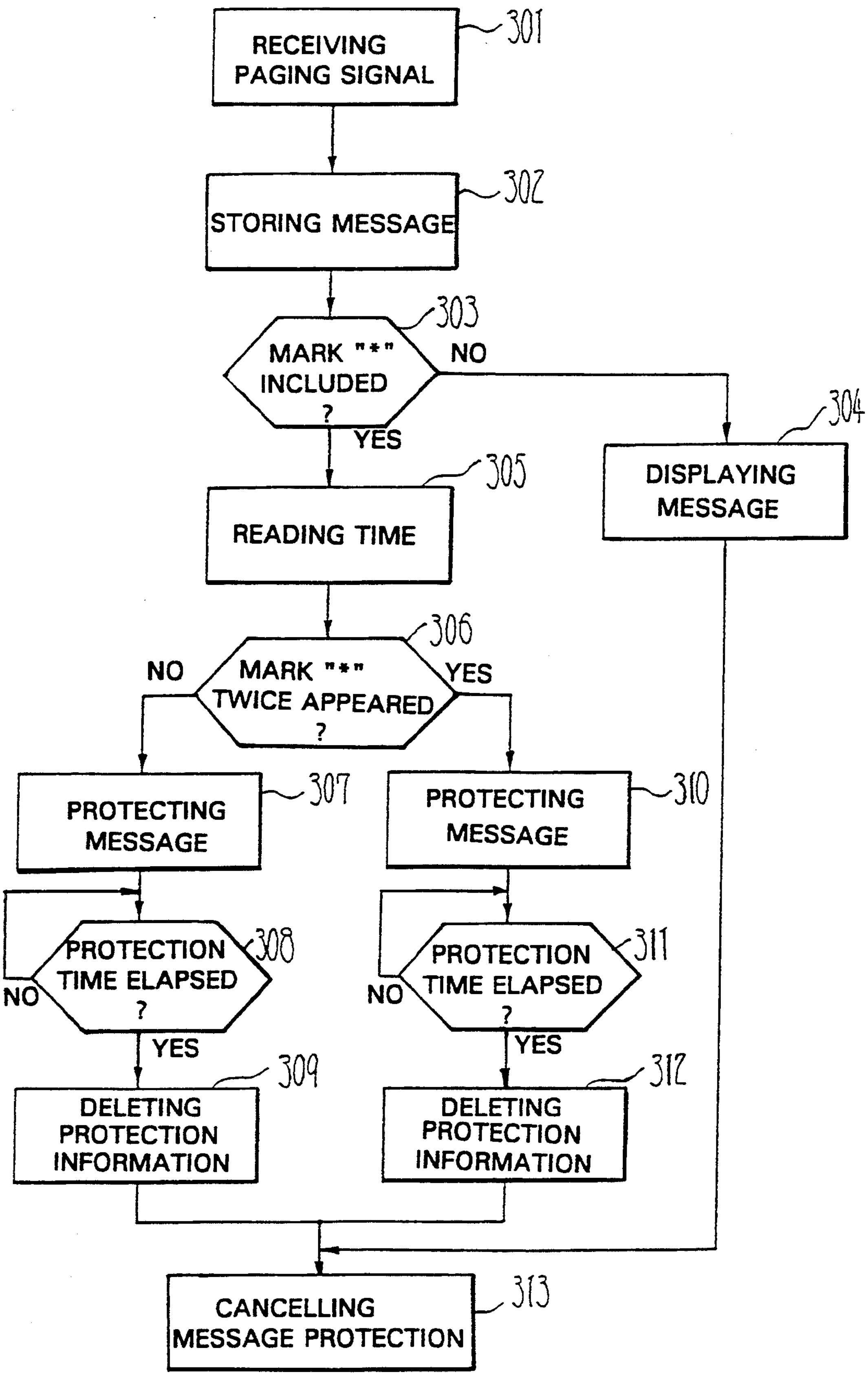
FIG. 3 is a flowchart demonstrating a specific procedure to be executed by the embodiment for processing and displaying a message signal.

Reference will now be made to FIGS. 3 and 4 for describing a specific operation of the embodiment for automatically protecting the above-stated specific message signal M and for automatically cancelling the protection. When the address signal included in the paging signal S4 is coincident with the address stored in the ROM 5 (step 301), the control circuit 61 delivers the first tone signal S8 to the amplifier 8 to thereby produce an alert tone through the loudspeaker 9. At the same time, the control circuit 61 stores the message signal M contained in the paging signal S4 in the RAM (message signal storage area) 62 (302). Then, the control circuit 61 determines whether or not the message signal M that was stored in the RAM 62 includes the mark "*" (303). Assuming receipt of the message signal Md1 which does not include the mark "*", the control circuit 61 genrates the display control signal S10 to display a message corresponding to the message signal Md1 on the display 10 (304) while automatically cancelling protection meant for the signal Md1 (313). Regarding the message signal Md1, only the characters C are stored in the RAM 62, as represented by a message signal No. M01, FIG. 4. The user of the pager may turn on the protect switch SW2 to protect the message Md1 or may turn on the delete switch SW3 to delete it, as desired. Such message signals Md1 which do not need protection are sequentially forced out of the RAM 62 by succeeding message signals M and are thereby automatically deleted, the message signal Md1 having the largest message number being first. Specifically, in FIG. 4, a message signal No. M16 which is protected is not deleted, and the other message signal Nos. 15, 14 and so forth are sequentially deleted in this order.

Assume that the message signals Md2 and Md3 are stored in the RAM 62 as message signals M. Then, since both of the message signals Md2 and Md3 include the particular mark "*" (303), the control circuit 61 starts the timer 7 by a control signal S7*a* and reads the time information being counted by the timer 7 by a control signal S7*b* (305). The control circuit 61 counts the mark or marks which occur for the first time in the message signal Md2 (306).

Since only one mark "*" appears for the first time in the message signal Md2, the control circuit 61 displays only the characters C of the message signal Md2 on the display 10 by removing the protection information "*aa*", while automatically protecting the message signal Md2 that has been stored in the RAM 62 (307). It is to be noted that the RAM 62 stores all the characters of the message signal Md, as represented by a message signal No. M02, FIG. 4. Subsequently, the control circuit 61 continuously compares the protection time aa of the message signal Md2 that has been automatically protected and the time information which it obtains from the timer 7, until they coincide (308). When they coincide, i.e., on the expiration of the protection time, the control circuit 61 deletes the protection information "*aa*" from the message signal Md2 stored in the RAM 62 (309). As a result, only the characters C included in the message signal Md2 are left in the RAM 62, as represented by a message signal No. M014, FIG. 4. Hence, the automatic protection of the message signal Md2 is automatically cancelled in a step 313. When the user turns on the display switch SW1 to see the message before the above-mentioned protection time expires, the control circuit 6 causes the display 10 to show a message corresponding only to the characters C.

On the other hand, since the mark "*" appears twice for the first time in the message signal Md (306), the control circuit 61 displays the protection time signal bb and characters C on the display 10 by removing three marks "*" from the message signal M3 in total. At the same time, the control circuit 61 automatically protects the message signal Md3 stored in the RAM 62 (310). At this instant, the RAM 62 stores all the characters of the message signal Md3, as represented by a message signal No. M03, FIG. 4. Subsequently, the control circuit 62 checks the protection time bb, as in the case with the message signal Md2. On the expiration of the protection time bb, the control circuit 61 deletes the three marks "*" of the message signal Md3 stored in the RAM 62 to thereby convert the signal Md3 to a message signal No. M15, FIG. 4 (312). As a result, the protection time signal bb of the message signal Md3 has the same meaning as the other characters C, whereby the protection of the message signal Md3 is automatically cancelled (313).

When the message signals Md2 and Md3A have the protection signal formats of the message signal M, the message signal M can be automatically protected and freed from the protection as stated above if the decision on the continuation of the mark "*" is replaced with the decision on the marks "*" and "[".

In summary, in the illustrative embodiment, the control circuit 61 can cause, on detecting protection information of a message signal M stored in the RAM 6, i.e., a protection time and a particular mark, the display 10 to display a message including or not including the protection information. The control circuit 61 protects message signal M over the protection time and, on the expiration of the protection time, automatically deletes it from the RAM 6. This prevents needless message signals from occupying the storage area of the RAM 6 and thereby enhances the effective use of the storage area. Since the message signal M containing protection information is forcibly protected until the protection time expires, it is prevented from being deleted in the storage area against the user's intention. Moreover, the embodiment frees the user from troublesome operations for protecting the message signal, which is valid only for a limited protection time, and by cancelling the protection by turning on switches.

Although the invention has been described with reference to the specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that appended claims will cover any modifications or embodiments as fall within the true scope of the invention.

What is claimed is:

1. A data display radio pager comprising:

receiving means for demodulating a radio frequency (RF) signal received via an antenna to produce a paging signal, decoding means for producing a call signal including an address signal and a message signal in response to said paging signal, ROM means for storing an address assigned to said pager, altering means for performing an altering operation in response to an alert signal, display means for displaying a message in response to a message control signal, and control means responsive to said call signal for outputting, if said address signal and said address stored in said ROM means are identical, said alert signal, storing said message signal in a message storage area, and outputting said message control signal associated with said message signal stored in said message storage area;

said control means comprising:

protecting information detecting means for detecting protection information from said message signal produced by said decoding means, said protection information being made up of a protection time signal indicative of a time over which said message signal should be protected from being erased and a particular mark occurring before and after the protection time signal, said protection information being included in said paging signal; and message signal protecting means responsive to said protection information for protecting said message signal stored in said message storage area until said protection time elapses.

2. A radio pager as claimed in claim 1, wherein said protection information detecting means comprises particular mark discriminating means for determining a type of said particular mark;

said control means for feeding to said display means a message indication associated with the type of said particular mark being determined by said particular mark discriminating means.

3. A radio pager as claimed in claim 2, wherein said particular mark discriminating means discriminates a first type of said particular mark in the form of a first character which occurs once before and once after said protection time signal, and a second type of said particular mark in the form of said first character which occurs twice before and once after said protection time signal.

4. A radio pager as claimed in claim 2, wherein said particular mark discriminating means discriminates a first type of said particular mark in the form of a first character which occurs once before and once after said protection time signal and a second type of said particular mark in the form of a second character different from said first character and occurring once before and once after said protection time signal.

5. A radio pager as claimed in claim 4, wherein one of said first character and second character comprises a numeral.

6. A data display radio pager comprising:

receiving means for demodulating a radio frequency (RF) signal received via an antenna to produce a paging signal, decoding means for producing a call signal including an address signal and a message signal in response to said paging signal, ROM means for storing an address assigned to said pager, alerting means for performing an alerting operation in response to an alert signal, display means for displaying a message in response to a message control signal, and control means responsive to said call signal for outputting, if said address signal and said address stored in said ROM means are identical, said alert signal, storing said message signal in a message storage area, and outputting said message control signal associated with said message signal stored in said message storage area;

said control means comprising:

protection information detecting means for detecting protection information from said message signal produced by said decoding means, said protection information being made up of a protection time signal indicative of a time over which said message signal should be protected from being erased and a particular mark occurring before and after the protection time signal, said particular mark being selectively of at least a first type or of a second type, said protection information being included in said paging signal; and message signal protecting means responsive to said protection information for protecting said message signal stored in said message area until said protection time elapses;

wherein said protection information detecting means comprises particular mark discriminating means for determining a type of said particular mark;

said control means being effective for feeding to said display means a message indication associated with the type of said particular mark determined by said particular mark discriminating means; and wherein said message indication associated with said first type of said particular mark, when discriminated and occurring within said protection time, is effective to cause display of said message signal without said particular mark and said protection time signal, while said message indication associated with said second type of said particular mark and occurring within said protection time is effective to cause display of said message signal without said particular mark.

7. A radio pager as claimed in claim 6, wherein on the expiration of said protection time, said stored message signal corresponding to said first type of said particular mark has said protection information thereof entirely deleted, while said stored message signal corresponding to said second type of said particular mark has only said particular mark thereof deleted.

8. A radio pager as claimed in claim 6, wherein said first type of said particular mark is in the form of a first character which occurs once before and once after said protection time signal, and said second type of said particular mark is in the form of said first character which occurs twice before and once after said protection time signal.

9. A radio pager as claimed in claim 8, wherein on the expiration of said protection time, said stored message signal corresponding to said first type of said particular mark has said protection information thereof entirely deleted, while said stored message signal corresponding to said second type of said particular mark has only said particular mark thereof deleted.

10. A data display radio pager, comprising:

receiving means for demodulating an RF signal received via an antenna to produce a paging signal, decoding means for producing a call signal including an address number signal and a message signal in response to said paging signal, ROM means for storing an address assigned to said pager, altering means for performing an alerting operation in response to an alert signal, display means for displaying a message in response to a message control signal, and control means responsive to said call signal for outputting, if said address signal and said address stored in said ROM means are identical, said alert signal, storing said message signal in a message storage area, and outputting said message control signal associated with said message signal stored in said message storage area;

said control means comprising:

protection information detecting means for detecting protection information from said message signal produced by said decoding means, said protection information being made up of a protection time signal indicative of a time over which said message signal should be protected from being erased and a particular mark occurring before and after the protection time signal, said protection information being included in said paging signal;

time outputting means for counting, in response to said protection information, a time having expired after the reception of said message signal;

comparing means for reading, in response to said protection information, said protection time from said stored message signal and comparing said protection time with the time being counted by said time counting means and for producing a result of said comparing;

message protecting means responsive to said result for protecting said stored message signal until said protection time elapses; and protection cancelling means responsive to said result for cancelling the protection of said stored message signal after said protection time has elapsed.

11. A radio pager as claimed in claim 10, wherein said control means further comprises particular mark discriminating means for discriminating a type of said particular mark detected from said stored message signal;

said control means being effective for delivering the message control signal in a form which gives a message indication corresponding to the type of said discriminated particular mark.

12. A radio pager as claimed in claim 11, wherein said particular mark discriminating means discriminates a first type of said particular mark in the form of a first character occurring once before and once after said protection time signal, and a second type of said particular mark in the form of said first character occurring twice before and once after said protection time signal.

13. A radio pager as claimed in claim 11, wherein said particular mark discriminating means discriminates a first type of said particular mark in the form of a first character occurring once before and once after said protection time signal, and a second type of said particular mark in the form of a second character different from said first character and occurring once before and once after said protection time signal.

14. A radio pager as claimed in claim 12, wherein one of said first character and said second character comprises a numeral.

15. A data display radio pager, comprising:

receiving means for demodulating an RF signal received via an antenna to produce a paging signal, decoding means for producing a call signal including an address number signal and a message signal in response to said paging signal, ROM means for storing an address assigned to said pager, alerting means for performing an alerting operation in response to an alert signal, display means for displaying a message in response to a message control signal, and control means responsive to said call signal for outputting, if said address signal and said address stored in said ROM means are identical, said alert signal, storing said message signal in a message storage area, and outputting said message control signal associated with said message signal stored in said message storage area;

said control means comprising:

protection information detecting means for detecting protection information from said message signal produced by said decoding means, said protection information being made up of a protection time signal indicative of a time over which said message signal should be protected from being erased and a particular mark occurring before and after the protection time signal, said protection information being included in said paging signal;

time outputting means for counting, in response to said protection information, a time having expired after the reception of said message signal;

comparing means for reading, in response to said protection information, said protection time from said stored message signal and comparing said protection time with the time being counted by said time counting means and for producing a result of said comparing;

message protecting means responsive to said result for protecting said stored message signal until said protection time elapses;

protection cancelling means responsive to said result for cancelling the protection of said stored message signal after said protection time has elapsed;

wherein said control means further comprises particular mark discriminating means for discriminating a type of said particular mark detected from said stored message signal, said type including a first type and a second type;

said control means being effective for delivering the message control signal in a form which gives a message indication corresponding to the type of said discriminated particular mark; and wherein said message indication associated with said first type of said particular mark, when discriminated and occurring within said protection time, is effective to cause display of said message signal without said particular mark and said protection time signal, while said message indication associated with said second type of said particular mark and occurring within said protection time is effective to cause display of said message signal without said particular mark.

16. A radio pager as claimed in claim 15, wherein on the expiration of said protection time, said stored message signal corresponding to said first type of said particular mark has said protection information thereof deleted, while said stored message signal corresponding to said second type of said particular mark has only said particular mark thereof deleted.

17. A radio pager as claimed in claim 11, wherein said message indication associated with a first type of said particular mark, when discriminated and occurring within said protection time, is effective to cause display of said message signal without said particular mark and said protection time signal, while said message indication associated with a second type of said particular mark and occurring within said protection time is effective to cause display of said message signal without said particular mark; and wherein said particular mark discriminating means discriminates said first type of said particular mark in the form of a first character occurring once before and once after said protection time signal, and said second type of said particular mark in the form of said first character occurring twice before and once after said protection time signal.

18. A radio pager in accordance with claim 17, wherein on the expiration of said protection time, said stored message signal corresponding to said first type of said particular mark has said protection information thereof deleted, while said stored message signal corresponding to said second type of said particular mark has only said particular mark thereof deleted.

* * * * *